United States Patent
Ghosh

(10) Patent No.: US 8,090,684 B2
(45) Date of Patent: Jan. 3, 2012

(54) SYSTEM AND METHOD FOR ASYNCHRONOUS CRAWLING OF ENTERPRISE APPLICATIONS

(75) Inventor: Rajesh Ghosh, Kalyani (IN)

(73) Assignee: Oracle International Corporation, Redwood Shores, CA (US)

( * ) Notice: Subject to any disclaimer, the term of this patent is extended or adjusted under 35 U.S.C. 154(b) by 332 days.

(21) Appl. No.: 12/547,810

(22) Filed: Aug. 26, 2009

(65) Prior Publication Data

US 2011/0055194 A1    Mar. 3, 2011

(51) Int. Cl.
G06F 7/00      (2006.01)
G06F 17/00     (2006.01)

(52) U.S. Cl. .......................... 707/610; 707/613
(58) Field of Classification Search .................. None
See application file for complete search history.

(56) References Cited

U.S. PATENT DOCUMENTS

| | | | | |
|---|---|---|---|---|
| 6,091,708 | A * | 7/2000 | Matsunuma | 370/233 |
| 7,937,364 | B1 * | 5/2011 | Chandrasekaran et al. | 707/636 |
| 2002/0078072 | A1 * | 6/2002 | Tan et al. | 707/201 |
| 2005/0193041 | A1 * | 9/2005 | Bourbonnais et al. | 707/204 |

OTHER PUBLICATIONS

Endeca solution overview: "Endeca for Intranet & Knowledge Management", 2008 Endeca Technologies, Inc.
Oracle Technology Network, "Oracle Streams—Features Overview", www.oracle.com/technology/products/dataint/htdocs/streams, visited Jan. 22, 2009.
"Oracle Streams—Features Overview", Oracle Data Sheet, 2007.
P. McElroy, et al. "Oracle Database 11g: Oracle Streams" An Oracle White Paper, Oracle Corporation, Jul. 2007.
R. Rajamani, et al. "Oracle Database 11g: Streams Advanced Queuing" An Oracle White Paper, Oracle Corporation, Jun. 2008.
T. Hoang, et al. "Oracle Database 11g: Oracle Streams Performance" An Oracle White Paper, Oracle Corporation, Nov. 2007.

* cited by examiner

*Primary Examiner* — Kuen Lu
*Assistant Examiner* — Tuan A Pham
(74) *Attorney, Agent, or Firm* — Kilpatrick Townsend & Stockton LLP

(57) ABSTRACT

Methods and systems for providing searchable data associated with enterprise applications are provided. An asynchronous feed may be generated from data stored in a database and searched by search engine crawlers. The feed may be populated with searchable data based on a searchable object definition that describes the location of searchable data within the database. The feed also may enforce access restrictions set by the enterprise applications to prevent unauthorized access to the searchable data.

17 Claims, 7 Drawing Sheets

SYSTEM AND METHOD FOR ASYNCHRONOUS CRAWLING OF ENTERPRISE APPLICATIONS

BACKGROUND OF THE INVENTION

Enterprise application data typically is stored in one or more databases, such as those in a relational database management system. To perform a full text search of data stored in an enterprise application, data to be crawled by a search engine typically is stored for retrieval at a later point in time. A search engine crawler, i.e., a computer or program that systematically retrieves and indexes data for searching, accesses the stored information to prepare a search index. To do so, stored enterprise application data are extracted from a database and provided to one or more search crawlers for indexing. Depending on the lifecycle of the enterprise application, various types of data access methodologies ("crawls") may be used. For example, where existing data is present in the enterprise application before it's accessed by the search engine, the entire set of existing data may be crawled into a search engine. This may be referred to as a "full crawl." Once a full crawl has been performed, "incremental crawls" may be performed to extract only data which has changed since the previous crawl. Different crawl techniques may require different amounts and types of resources from the associated enterprise application. For example, a full crawl may require a large amount of data access, but little processing time since all the data in the application can be quickly provided by a single lookup command. Similarly, an incremental crawl may require more processing resources to identify the relevant data in the application.

Different crawl methodologies also may be used. Third-party and web-based search engines commonly use synchronous crawling techniques. In a synchronous crawl, a search crawler requests information to be stored and indexed for use by the search engine. Typically, the crawler interacts with an application or server containing the information to be indexed using HTTP or a similar protocol. In response to the request, one or more applications containing the requested data process the request and serve the appropriate data to the crawler. In contrast, an asynchronous technique may use a file system to pre-process enterprise application data into a regular file. The search engine crawler then processes data from the regular file instead of directly from the enterprise application as occurs in a synchronous search technique.

BRIEF SUMMARY OF THE INVENTION

Embodiments of the present invention provide methods and systems for providing searchable data from an enterprise application, which include accessing an event message queue that includes a plurality of event messages describing events in a database associated with an enterprise application, de-queuing a plurality of the event messages from the event message queue. Rules may be generated by identifying tables referred to in a searchable object definition and excluding non-referenced tables from consideration when applying the searchable object definition to filter out events which do not originate from referenced tables. De-queued event messages may be selected for generating a feed based on a searchable object definition associated with the enterprise application, where the searchable object definition provides information regarding the location of searchable data within one or more database tables associated with the enterprise application. An asynchronous feed may be generated from the de-queued messages, and provided to a search engine crawler for indexing into the search engine.

In other embodiments of the present invention, an update notification generated by a database system may be received, that is generated in response to a change made to data in a database table associated with an enterprise application. A searchable object definition associated with the database table may be identified, where the searchable object definition identifies the location of searchable data within the database table. Based upon the searchable object definition, a change to searchable data caused by the change made to the data in the database table may be identified. An event message that describes the change to searchable data may be constructed from the update notification, and added to an event message queue. Event messages then may be de-queued and transformed to asynchronous feed messages in an asynchronous feed, which can be accessed by a search engine crawler. In some embodiments, these pre-processed feeds may be further queued in one or more message queues for deferred and/or secure retrieval by a search engine crawler.

DETAILED DESCRIPTION OF THE INVENTION

Figure 1:
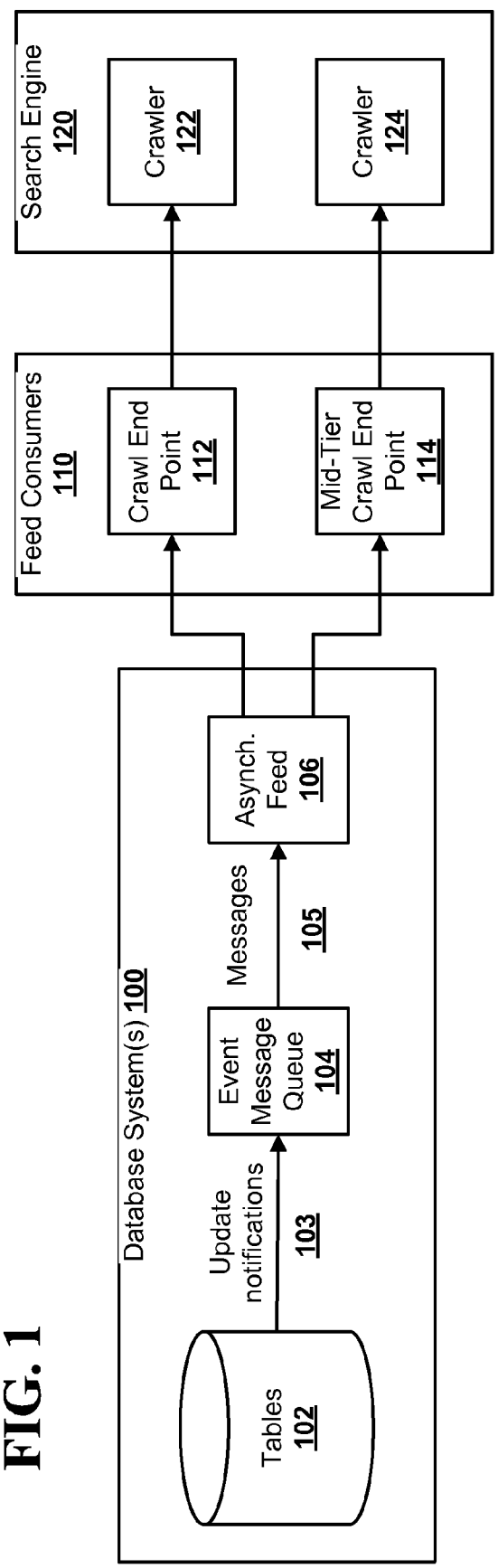
FIG. 1 shows an example of a system for performing asynchronous crawls of enterprise data according to embodiments of the present invention.

It has been found that performing search crawls on a production system (i.e., a system in active use for business purposes) can cause significant processing or other overhead on the production system, reducing the efficiency or availability of the system. Synchronous crawl requests can cause significant overhead to middle tiers of an enterprise application, such as a graphical user interface that accepts client requests and sends corresponding commands to an underlying enterprise application, as well as the underlying enterprise applications and associated database(s) themselves, because the system must first extract data from the database, then convert it to a format usable by the search crawler.

In addition, for a crawl to be effective, the application generally has to respond within a relatively short time frame after it receives the crawl request. For example, the protocol used to make the request may have an associated response/request timeout period, within which the application is expected to respond to a crawl request. To meet these timing requirements, an enterprise system that provides data to a search crawler may not be able to schedule responses efficiently according to other demands for the system's resources, which can cause further overhead in the system. Some search methodologies attempt to mitigate these effects by scheduling crawls during times that the enterprise applications being searched are expected to have relatively low demand, such as when the enterprise applications are expected to be at minimum usage. While this may reduce the overhead or strain on the system, it also may cause additional demands on resource scheduling of the enterprise system, such as restricting the time periods during which users can expect full functionality or responsiveness from the system.

To address these issues, some search crawling systems use asynchronous techniques in which a file system is used to pre-process enterprise application data into a regular file. The search engine crawler then processes data from the regular file instead of directly from the enterprise application as occurs in a synchronous search technique. Although asynchronous techniques can reduce the processing overhead on the enterprise application being crawled, they may significantly decrease the security of the enterprise system. A search crawler generally runs at a pre-set security level and/or with certain privileges to access data within the enterprise application. However, when enterprise data is stored in regular files, users or program that normally would not have access to certain enterprise data may be able to access the data stored in the regular files. For example, a privileged administrator at the operating system level may be able to read the regular files and access the enterprise data stored in them, regardless of any authorization the administrator may or may not have in the enterprise system. Similarly, privileged applications running on a local level may be able to access the regular files, although the applications would not normally be able to access data in the enterprise application.

Embodiments of the current invention provide methods and systems for asynchronous crawling, which preserve security within the enterprise system and cause little or minimal runtime overhead to the production enterprise system.

FIG. 1 shows an example of a system for performing asynchronous crawls of enterprise data according to embodiments of the present invention. One or more database systems 100 may include a set of database tables 102. As is known in the art, an enterprise application may include any number of database tables which store data and settings for the application, ranging from a few tables to several tens of thousands or more. Typically, some of the database tables store searchable data or data that can be converted into searchable data, and other tables store data that cannot be searched or for which there is no expected user demand for searchability. In an embodiment, a searchable object definition may define the location, type, and other attributes of searchable data within one or more enterprise applications. The structure and use of searchable object definitions is described in further detail in U.S. application Ser. No. 12/201,308, filed Aug. 29, 2008, entitled "System and Method for Searching Enterprise Application Data," the disclosure of which is incorporated by reference in its entirety for all purposes. Notably, a searchable object definition may be used to identify the location of searchable data within an enterprise application, and construct appropriate interfaces for accessing and retrieving the data in a searchable form.

When data is added to, deleted from, or changed within the tables 102, one or more update notifications 103 may be generated within the database systems. The update notifications may include information about changes made to the data in the tables 102, and may include a copy of new or updated data added to the tables. Update notifications are provided by most commercial database management systems. The notifications may be processed (consumed) by an event message queue 104. Examples of suitable event message queues include ORACLE STREAMS® systems available from Oracle Corp. In general, an event message queue may process the update notifications and, for each notification, generate one or more messages describing the change made to the database tables. That is, the event message queue may convert the update notifications into messages that can be provided in a queue. Other applications may access the queue and explicitly de-queue messages to obtain information about changes made to data stored in the database tables.

Although an event message queue may be used to provide information about changes made to data stored in a database system, a message queue typically includes a good deal of information that is not in a searchable form or that is otherwise unsuitable for use by a search engine crawler. In addition, change event queues typically indicate whether one or more particular data row in a table have changed. Depending on how many searchable object definitions reference the table, there could be multiple consumers of the associated event, and each search object may reference additional tables to construct a meaningful, end-user and crawler-consumable form of information. Thus, the event queue information by itself may not be sufficient to feed a search crawler. To provide data suitable for use by a search engine crawler, the event messages 105 generated by the event message queue 104 may be de-queued and processed into an asynchronous feed queue 106 based on information provided in one or more searchable object definitions. The process of generating an asynchronous feed using searchable object definitions is described in further detail below. The feed queue 106 may include new or updated data from the database tables in a form suitable for use by a search engine crawler. In an embodiment, the feed queue 106 may present searchable data using a standardized or known format, as described in further detail below. As a specific example, an RSS feed may include a series of entries, each of which includes searchable data extracted from the database tables 102, i.e., searchable data associated with one or more enterprise application which use the database tables 102 to store enterprise data. In contrast to a synchronous queue or other similar data source, an asynchronous feed typically does not have requirements that a response to a crawl or other request is provided with a matching reply within a certain period of time to prevent connection loss. Rather, an asynchronous feed is continually updated, and a crawler or other requester may access the feed as desired. As used herein, a feed refers to a source or item of searchable information generated by an enterprise application presented in a standardized format. In some embodiments, a feed may be presented in a syndicated data format, examples of which include the Atom Syndication Format, Really Simple Syndication/Rich Site Summary (RSS), FeedSync, GData, hAtom, News Markup Language (NewsML), Information and Content Exchange (ICE), Open Content Syndication (OCS), Outline Markup Language (OML), Outline Processor Markup Language (OPML), Resource Description Framework (RDF), Synchronization Markup Language (SyncML), and eXtensible Open XHTML Outline (XOXO) syndication formats. Multiple feed formats may be provided, such as where different feed consumers request or prefer different formats. The feed may be provided to a requester over any suitable network transport protocol, examples of which include HTTP, FTP, and other network protocols.

One or more feed consumers 110 may access the asynchronous feed queue 106. Feed consumers may access the asynchronous feed 106 by way of a crawl end point 112, i.e., an external interface directly connected to or provided by a search engine crawler 122. Feed consumers also may access the feed 106 via a mid-tier crawl point 114, such as middleware that accesses, processes, and/or provides feed data to a final consumer such as a search engine crawler 124. A specific example of a mid-tier crawl point is the Secure Enterprise Search system from Oracle Corp., which provides a secure searchable interface to enterprise applications. As previously described, one or more search engine crawlers 122, 124 typically crawl searchable data for indexing by a search engine 120. In embodiments of the present invention, the crawlers 122, 124 may access an asynchronous feed to obtain searchable data contained therein, and process it for use by the search engine 120.

In some embodiments, the event message queue 104, the feed queue 106, or both may be provided by database systems that are separate from the system 100 that provides and maintains the tables 102. The message queue 104 and feed queue 106 may be provided by the same system, or each may be provided by a separate system in communication with the central database system 100.

Figure 2A:
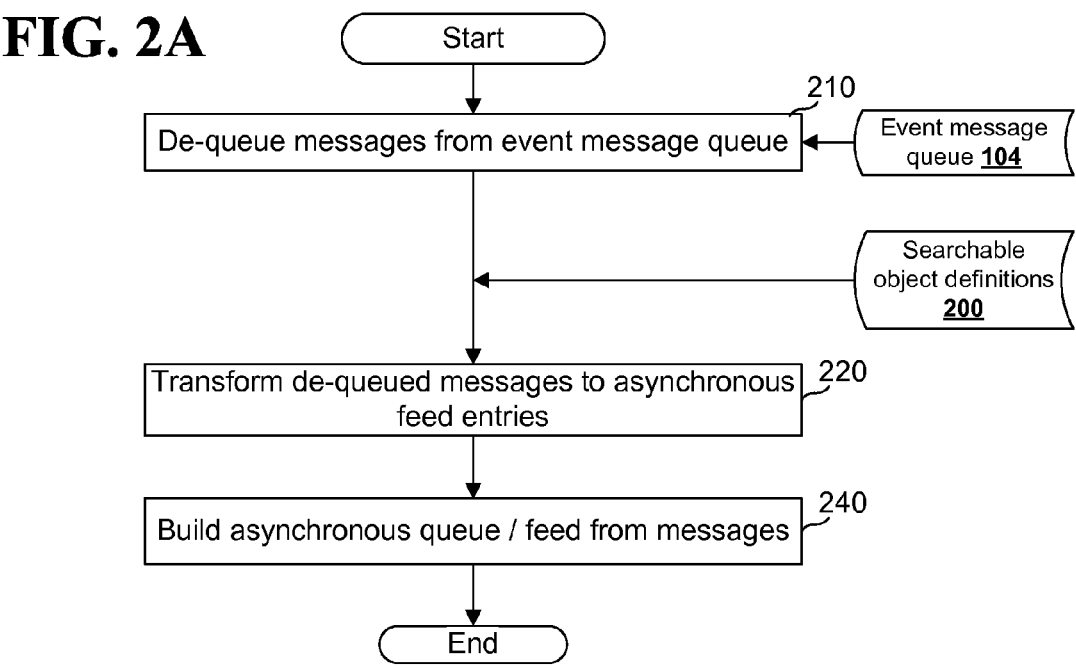
FIG. 2A shows an example process for generating an asynchronous feed according to an embodiment of the present invention.

FIG. 2A shows an example process for generating an asynchronous feed according to an embodiment of the present invention. At 210, one or more messages may be de-queued from an event message queue. Each event message relates to one or more database tables as previously described. For each message, if the message relates to a table that is referenced by one or more searchable object definitions, the system consults the appropriate searchable object definition to identify the location of searchable data within the table. The tables referenced by a searchable object definition may be established when a searchable object is defined, validated and activated in the enterprise application. When it is defined, the searchable object definition may be analyzed to determine which database tables are referred in the definition. Based on the referenced tables, rules may be defined in the database to capture changes made to referenced tables. The rules may, for example, filter out irrelevant change events from being enqueued into the event queues. An illustrative example to setup such a rule is shown below:

```
BEGIN
    DBMS_STREAMS_ADM.ADD_TABLE_RULES(
    table_name => 'per.PER_ALL_PEOPLE_F',
    streams_type => 'capture',
    streams_name => 'APPSEARCH_CAPTURE_01',
    queue_name => 'APPSEARH_ASYNC_Q01',
    include_dml => true,
    include_ddl => false,
    include_tagged_lcr => false,
    source_database => null,
    inclusion_rule => true);
END;
```

The example rule establishes a capture process in the current database to capture all DML changes to the table PER_ALL_PEOPLE_F. Multiple rules may be created if a searchable object definition spans multiple tables. An illustrative example of such rules is shown below:

```
BEGIN
    DBMS_STREAMS_ADM.ADD_TABLE_RULES(
    table_name => 'per.PER_ALL_ASSIGNMENTS_F',
    streams_type => 'capture',
    streams_name => 'APPSEARCH_CAPTURE_02',
    queue_name => 'APPSEARH_ASYNC_Q01',
    include_dml => true,
    include_ddl => false,
    include_tagged_lcr => false,
    source_database => null,
    inclusion_rule => true);
END;
```

As illustrated by these examples, messages in an event queue result from one or more searchable objects which reference the associated table.

Still referring to FIG. 2A, at 220, if the associated table contains searchable data, the de-queued message is transformed to an asynchronous feed entry based on the description of searchable data as provided the searchable object definition 200. An illustrative example of an event message is a Logical Change Record (LCR) as defined in an ORACLE® database, which may be a schema-compliant XML file. An illustrative example of an LCR is provided below:

```
<ROW_LCR xmlns='http://xmlns.oracle.com/streams/schemas/lcr'
xmlns:xsi='http://www.w3.org/2001/XMLSchema-instance'
xsi:schemaLocation='http://xmlns.oracle.com/streams/schemas/lcr
http://xmlns.oracle.com/streams/schemas/lcr/streamslcr.xsd'>
    <source_database_name>source_dbname</
    source_database_name>
    <command_type>INSERT</command_type>
    <object_owner>per</object_owner>
    <object_name>PER_ALL_PEOPLE_F</object_name>
    <tag>0ABC</tag>
    <transaction_id>0.0.0</transaction_id>
    <scn>xxxxxxxxxxx</scn>
    <old_values>
        <old_value>
    <column_name>PERSON_ID</column_name>
    <data><number>9329</number></data>
    </old_value>
    <old_value>
    <column_name>EFFECTIVE_START_DATE</column_name>
    <data><date><value>2000-08-18</value><format>SYYYY-MM-DD</format></date>
    </old_value>
    <old_value>
    <column_name>FULL_NAME</column_name>
    <data><varchar2>Corsaro, Santi</varchar2></data>
    </old_value>
       <!--May repeat for all columns -->
    </old_values>
    <new_values>
    <new_value>
    <column_name>PERSON_ID</column_name>
    <data><number>9329</number></data>
    </new_value>
    <new_value>
    <column_name>EFFECTIVE_START_DATE</column_name>
    <data><date><value>2001-06-26</value><format>SYYYY-MM-DD</format></date>
    </new_value>
    <new_value>
    <column_name>FULL_NAME</column_name>
    <data><varchar2>Corsaro, Santi</varchar2></data>
    </new_value>
    <!--May repeat for all the columns -->
    </new_values>
</ROW_LCR>
```

An illustrative example of a entry resulting from the example change event is shown below:

```
<rss xmlns:xsi="http://www.w3.org/2001/XMLSchema-instance" version="2.0">
  <channel>
    <title>RSS for Oracle Applications Search</title>
    <link>null/DataFeed</link>
    <description>RSS for Oracle Applications Search</description>
    <lastBuildDate>2009-06-02T08:50:33.786Z</lastBuildDate>
    <channelDesc xmlns="http://xmlns.oracle.com/orarss" ></channelDesc>
    <item>
<link><![CDATA[http://oracle.apps.search.com/appsearch/EBIZXXOBJ:Person?ASSIGNMENT_ID=
8645&PERSON_ID=9329&EFFECTIVE_START_DATE=2001-06-26]]></link>
      <title><![CDATA[Corsaro, Santi]]></title>
      <itemDesc xmlns="http://xmlns.oracle.com/orarss">
        <documentMetadata>
          <accessURL><![CDATA[/OA_HTML/RF.jsp?function_id=1038349&resp_id=-
1&resp_appl_id=-1&security_group_id=0&lang_code=US&params=sHH.nlmo-
RwLTU8jgUxVX9RE1.VM8y-N50r9.Iohaf2Wprxkye9ycXPCat-
uVRqRVG1OswZMbV1ug1SHe31Rqxxmy8Efynh2R4wOJwGQWsU]]></accessURL>
          <language>en</language>
          <docAttr name="BUSINESS_GROUP_ID"
type="decimal"><![CDATA[911]]></docAttr>
          <docAttr name="EFFECTIVE_START_DATE" type="dateTime">2001-06-
26T07:00:00.000Z</docAttr>
          <docAttr name="FULL_NAME"><![CDATA[Corsaro, Santi]]></docAttr>
          <docAttr name="GLOBAL_NAME"><![CDATA[Corsaro, Santi]]></docAttr>
          <docAttr name="PERSON_ID" type="decimal"><![CDATA[9329]]></docAttr>
          <docAttr name="DATE_OF_BIRTH" type="dateTime">1974-02-
17T07:00:00.000Z</docAttr>
          <docAttr name="EMPLOYEE_NUMBER"><![CDATA[112]]></docAttr>
          <docAttr name="ASSIGNMENT_ID" type="decimal"><![CDATA[8645]]></docAttr>
        </documentMetadata>
        <documentAcl>
          <securityAttr name="EBS_ACL_KEY">xyz100001x</securityAttr>
        </documentAcl>
        <documentInfo>
          <status>STATUS_OK_FOR_INDEX</status>
        </documentInfo>
        <documentContent>
          <content type="text/plain"><![CDATA[2001-06-26 Corsaro, Santi Corsaro, Santi
1974-02-17 112]]></content>
        </documentContent>
      </itemDesc>
    </item>
    <item>
<link><![CDATA[http://oracle.apps.search.com/appsearch/EBIZXXOBJ:Person?ASSIGNMENT_ID=
8649&PERSON_ID=9333&EFFECTIVE_START_DATE=2001-09-25]]></link>
      <title><![CDATA[Frank, Helga]]></title>
      <itemDesc xmlns="http://xmlns.oracle.com/orarss">
        <documentMetadata>
          <accessURL><![CDATA[/OA_HTML/RF.jsp?function_id=1038349&resp_id=-
1&resp_appl_id=-
1&security_group_id=0&lang_code=US&params=hjQy0UaHJGKhBqJsrk11ttRE1.VM8y-
N50r9.Iohaf0L7B.CKJtd81S5qfGQz94.wLtGUiBtUzxLZUUW7fFtZEDcZpey74WkLNXkh1c7x
Dw]]></accessURL>
          <language>en</language>
          <docAttr name="BUSINESS_GROUP_ID"
type="decimal"><![CDATA[911]]></docAttr>
          <docAttr name="EFFECTIVE_START_DATE" type="dateTime">2001-09-
25T07:00:00.000Z</docAttr>
          <docAttr name="FULL_NAME"><![CDATA[Frank, Helga]]></docAttr>
          <docAttr name="GLOBAL_NAME"><![CDATA[Frank, Helga]]></docAttr>
          <docAttr name="PERSON_ID" type="decimal"><![CDATA[9333]]></docAttr>
          <docAttr name="DATE_OF_BIRTH" type="dateTime">1971-09-
05T07:00:00.000Z</docAttr>
          <docAttr name="EMPLOYEE_NUMBER"><![CDATA[116]]></docAttr>
          <docAttr name="ASSIGNMENT_ID" type="decimal"><![CDATA[8649]]></docAttr>
        </documentMetadata>
        <documentAcl>
          <securityAttr name="EBS_ACL_KEY">xyz100001x</securityAttr>
        </documentAcl>
        <documentInfo>
          <status>STATUS_OK_FOR_INDEX</status>
        </documentInfo>
```

```
            <documentContent>
                <content type="text/plain"><![CDATA[2001-09-25 Frank, Helga Frank, Helga 1971-
09-05 116]]></content>
            </documentContent>
        </itemDesc>
    </item>
  </channel>
</rss>
```

Still referring to FIG. 2A, at 240, the feed entries are placed into the asynchronous feed, where they can be consumed by a search engine crawler.

Figure 2B:
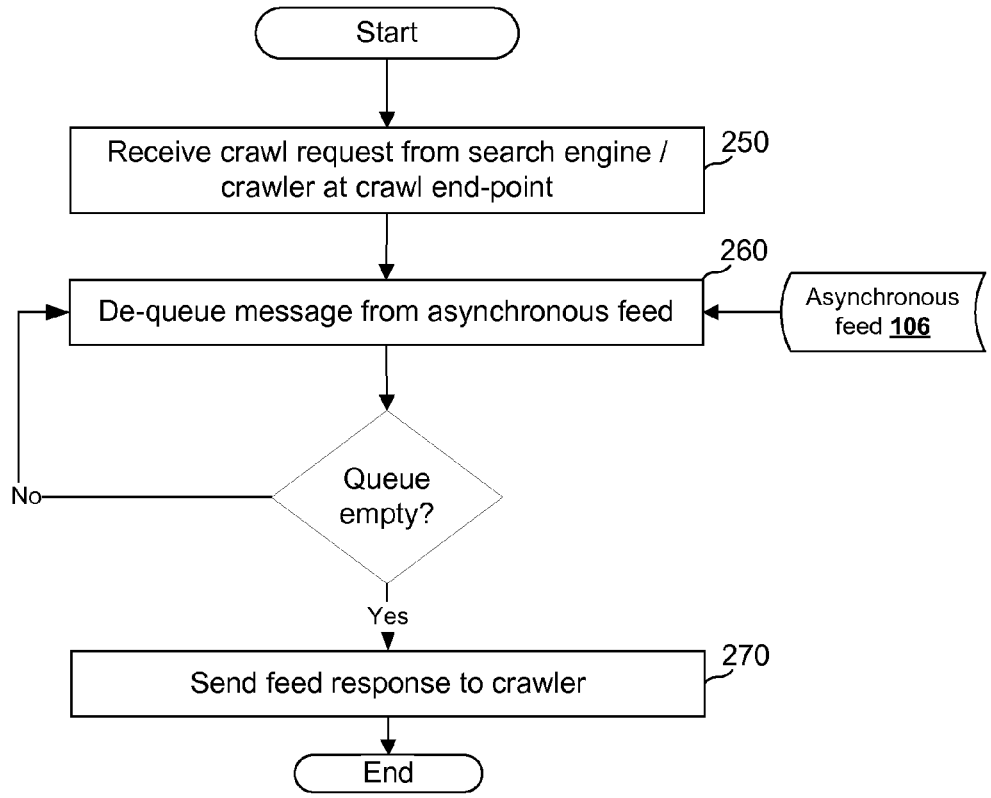
FIG. 2B shows an example process for retrieving searchable data from an asynchronous feed according to an embodiment of the present invention.

FIG. 2B shows an example process for retrieving searchable data from an asynchronous feed according to an embodiment of the present invention. At 250, a crawl request or instruction may be received from a search engine or a search engine crawler to initiate a crawl of an enterprise application or an associated database. A search engine crawler may then de-queue a feed entry (message) from an asynchronous queue, such as an RSS feed. Feed access, such as de-queuing of messages from the asynchronous feed, may be controlled using the permission and access system of the associated enterprise application. Thus, the crawler may access only information in the feed appropriate for its access level, without providing unacceptable access to other entities. For example, the search engine crawler may operate at with the access privileges of an application user. When accessing the asynchronous feed, the search engine crawler may be prevented from accessing data to which a user would be denied access, or to which the enterprise application would not provide access. The process of de-queuing messages from the asynchronous feed may continue until a certain amount of data is obtained, until the feed is empty, or until another condition is reached. After de-queuing messages, a feed response may be sent to the crawler at 270. The response typically will include searchable data that can be processed by the crawler for indexing by the search engine, but other data may be included.

Figure 2C:
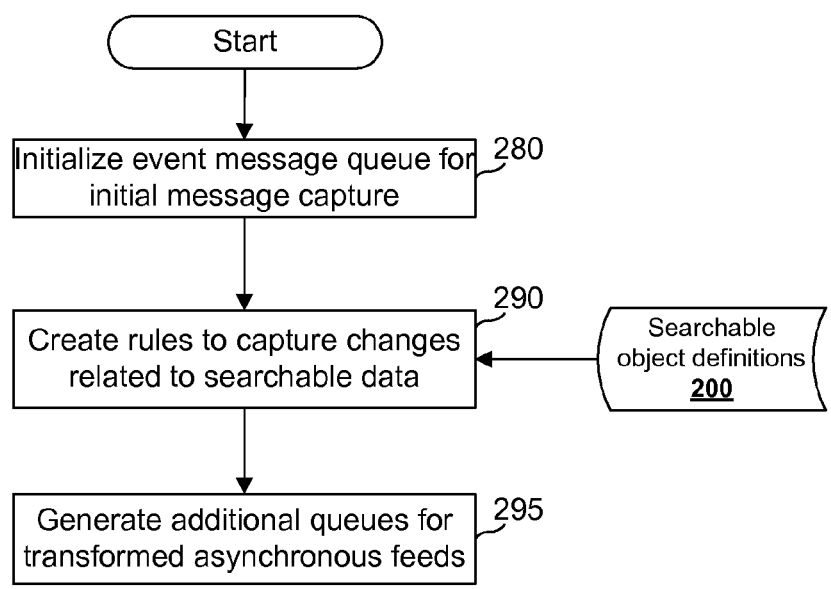
FIG. 2C shows an example process for generating an event message queue according to an embodiment of the present invention.

In a simple configuration, the event message queue may capture all changes reflected in the update notifications provided by the database system. However, such a configuration may be inefficient, since many of the updates made to the tables may be unrelated to searchable data contained in the tables. To improve the efficiency of the system, the event message queue may create event messages for a subset of the update notifications. FIG. 2C shows an example process for generating an event message queue according to an embodiment of the present invention. At 280, the event message queue is initialized, such as by generating a new queue. The specific processes to generate a new event message queue may be specific to a particular database or queuing system, and will be readily understood by one of skill in the art. At 290, one or more searchable object definitions 200 may be consulted to identify the location of searchable data within database tables for which the event message queue will provide information about updates to the tables. Based on the searchable object definitions, at 290 one or more rules may be defined that specify, for example, what types of update notifications the event message queue should transform to asynchronous queue messages, which tables should be monitored for changes to searchable data. An illustrative example of a rule defined for a searchable object definition is provided above. Other rules may be used. Such a filtering scheme may allow for fine-grained control over the data changes that ultimately are crawled by search engine crawlers, which may reduce the resources needed to provide or crawl searchable data since not all changes in the database will need to be analyzed and/or crawled. At 295, additional queues may be initialized and populated with asynchronous messages. Additional queues may be used where search engines are expected to spawn multiple crawlers or crawl processes that operate in parallel.

The rules generated at 290 may change when searchable object definitions associated with the database system are updated. Changes to searchable object definitions typically only occur when there are structural or logical changes to the database, such as changes to the database schemas. Therefore, it is not expected that the rules will be updated regularly, and the process described with respect to FIG. 2C may not need to be re-run after the initial setup. However, since the event message queue and/or the asynchronous feed may reside on a separate database or other system from the database tables 102, changes may be made to the rules without significant interruption to operation of the production database system 100. Subsequently, the asynchronous feed will be updated according to the updated rules.

Various message types may be used by the system in constructing the event message queue 104. For example, in an embodiment logical change records (LCRs) may be used to construct the message queue. Other messages, such as user defined messages, also may be used. Typically, each message records a single change in a database object. The use of different message types may be handled by a queuing system, such as Oracle Streams.

Figure 3:
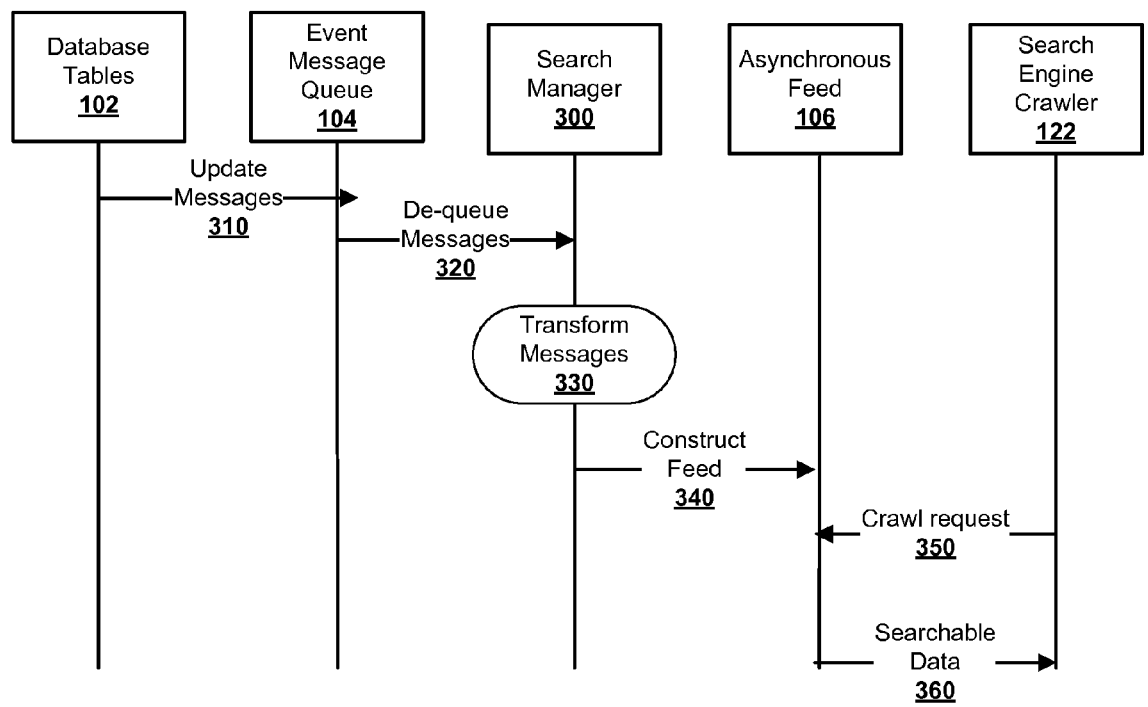
FIG. 3 shows an example message flow according to an embodiment of the present invention.

FIG. 3 shows an example message flow according to an embodiment of the present invention. As previously described, update messages may be generated at 310 by a database system when changes, additions, and/or deletions are made to data stored in the database tables. The update notifications may be used to generate an event message queue 104. Messages in the event message queue may be de-queued 320 and converted 330 to asynchronous feed entries by a consumer of the queue, such as a search manager 300. In an embodiment, searchable object definitions may be used to identify searchable data within the update messages and construct the asynchronous feed entries at 330 appropriately. An asynchronous feed 106 may be constructed 340 from the transformed messages. A search engine crawler 122 may then access searchable data provided by the asynchronous feed by sending crawl requests 350 and receiving searchable data 360 in return.

Although described with respect to updates made to database tables, it will be understood that the methods and processes described with respect to FIGS. 1-3 may be used to enable searching of all searchable data in an enterprise application. For example, an initial crawl may be performed to establish an initial set of searchable data, which is then updated using the techniques previously described. For example, during an initial crawl user-defined messages may be programmatically added to the event queue, instead of automatically queuing LCRs upon a database update. This may provide relatively fine control over the amount of data to be processed at a particular time. Such control may be desirable to manage the relatively large amount of data that may be processed during an initial crawl. Such a method may be used where an asynchronous feed technique is to be applied to a pre-existing application, which may already have been crawled. Similarly, the asynchronous feed techniques described herein may be applied to a new application or database table, which has not previously been crawled and/or which does not initially contain searchable data. In this case, as data is entered into the database it will be considered as data updates and processed accordingly.

The methods and systems described herein may be used with a variety of search engines and other systems. As a specific example, the ORACLE® Secure Enterprise Search Crawler may be used to access and crawl an asynchronous feed. It will be understood that other crawlers and search engines may be used without departing from the scope of the invention.

The methods and systems described herein may allow for increased scalability of searchable enterprise systems through use of a multiple databases. In some embodiments, event messages may be propagated to a second database, which may be referred to as a stand-by database. Feeds may then access the stand-by database instead of a production database. For example, the event message queue 104 described with respect to FIG. 1 may be stored in the stand-by database. Such embodiments may further reduce the processing and scheduling resources required for an enterprise application to respond to crawler search requests, since such requests may be directed to and answered by the stand-by database. Other configurations may be used, such as where crawl requests are routed among multiple databases, and/or processed differently depending upon the availability of the various databases in the enterprise application system.

Figure 4:
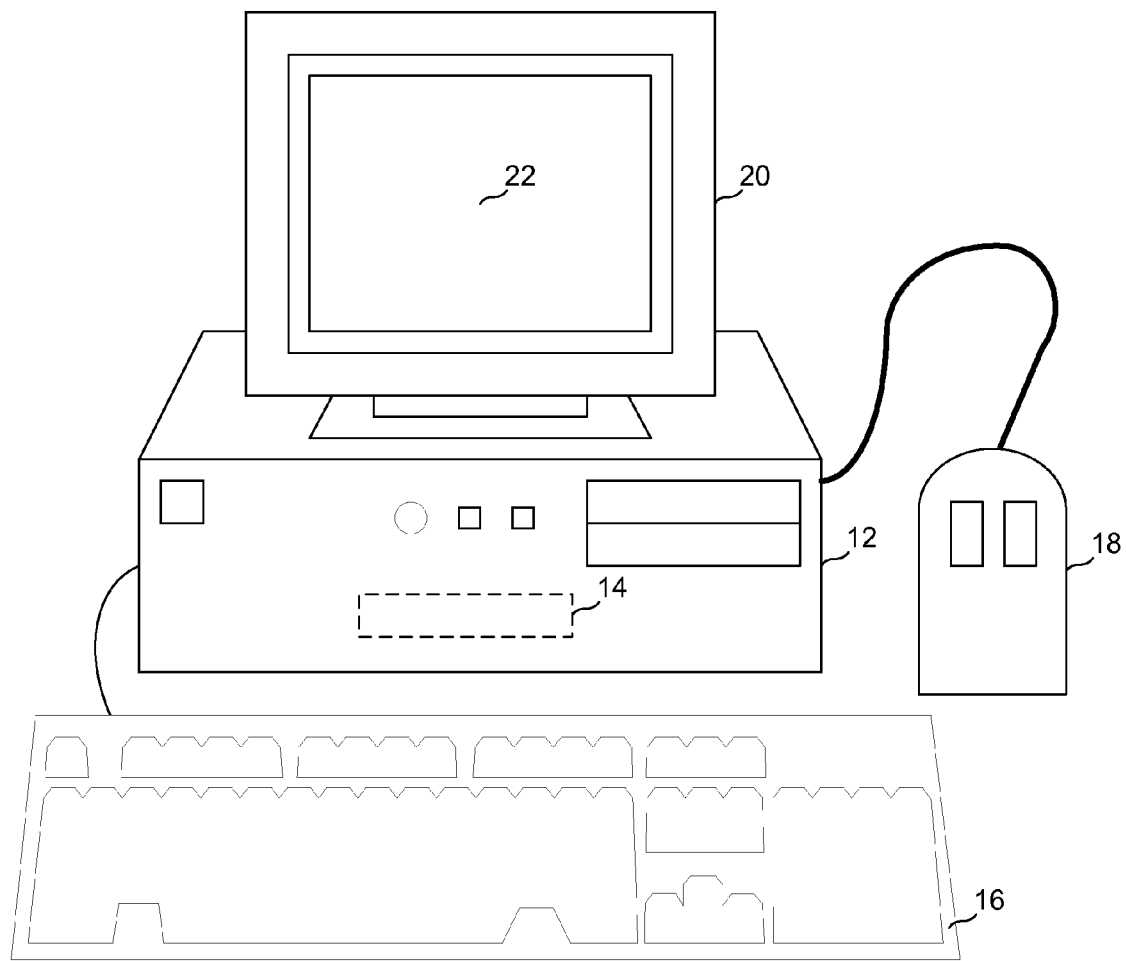
FIG. 4 shows a computer suitable for use with embodiments of the present invention.

FIG. 4 shows a computer suitable for use with embodiments of the present invention. The computer 10 may include a processing unit 12, which may include one or more computer readable storage media 14. The computer may interface with a human operator via an output 20, which may include a visual display 22 to display text, graphics, video, and other visual data. The computer may receive input via a mouse 18, keyboard 16, and/or any other suitable user interface. The general operation of the computer 10 will be understood to one of skill in the art.

Figure 5:
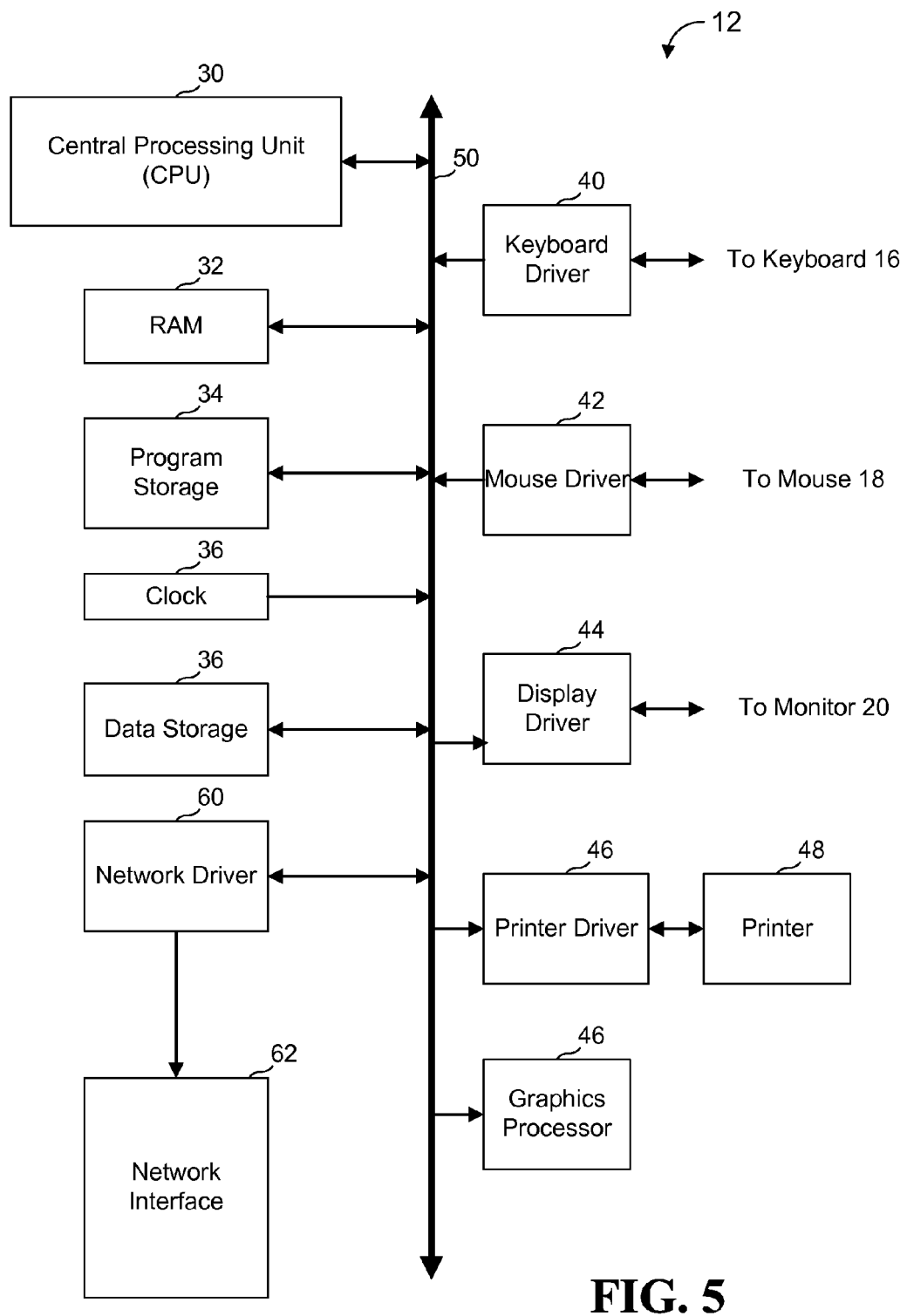
FIG. 5 shows a schematic diagram of the processing unit illustrated in FIG. 4.

FIG. 5 shows a schematic diagram of the processing unit 12 illustrated in FIG. 4. A central processing unit 30 may communicate with various other components via a main bus 50 and other suitable communication lines (not shown). Data may be stored in volatile memory such as RAM 32, program storage 34 and/or data storage 36. The program storage 34 and/or data storage 36 may include various types of computer-readable media, such as CD-ROMs or other type of optical disks, floppy diskettes, ROMs, RAMs, EPROMs, EEPROMs, magnetic or optical cards and drives, flash memory, or other types of machine-readable mediums suitable for storing electronic instructions. Computer-readable instructions may be stored in the program storage 34. When executed by the computer, these instructions may cause the computer to implement specific methods as described herein, and may cause the computer to operate in accordance with those methods. In an embodiment, execution of the instructions stored in the program storage 34 may transform a general-purpose computer into a computer configured to perform one or more methods embodied by the instructions. A clock 35 may be used to synchronize operation of the other elements of processing unit 12. A network driver 60 may manage connections between a network interface 62, such as a TCP/IP or other suitable interface, to allow the computer to communicate with other computers, operators, or other entities. A keyboard driver 40 may communicate with the keyboard 16 to receive input from an operator. A mouse driver 42 may manage communication with the mouse 18 to coordinate reception of input signals. A display driver 44 may manage communications between the processing unit 12 and the monitor 20, such as to display appropriate output on the monitor 20. Similarly, a printer driver 46 may manage communications with a printer 48. A graphics processor 46 may generate and manage manipulation and display of graphical elements such as 2D images, 3D images and objects, and other visual elements. The general operation of the various components shown in FIG. 5 otherwise will be understood by one of skill in the art.

Figure 6:
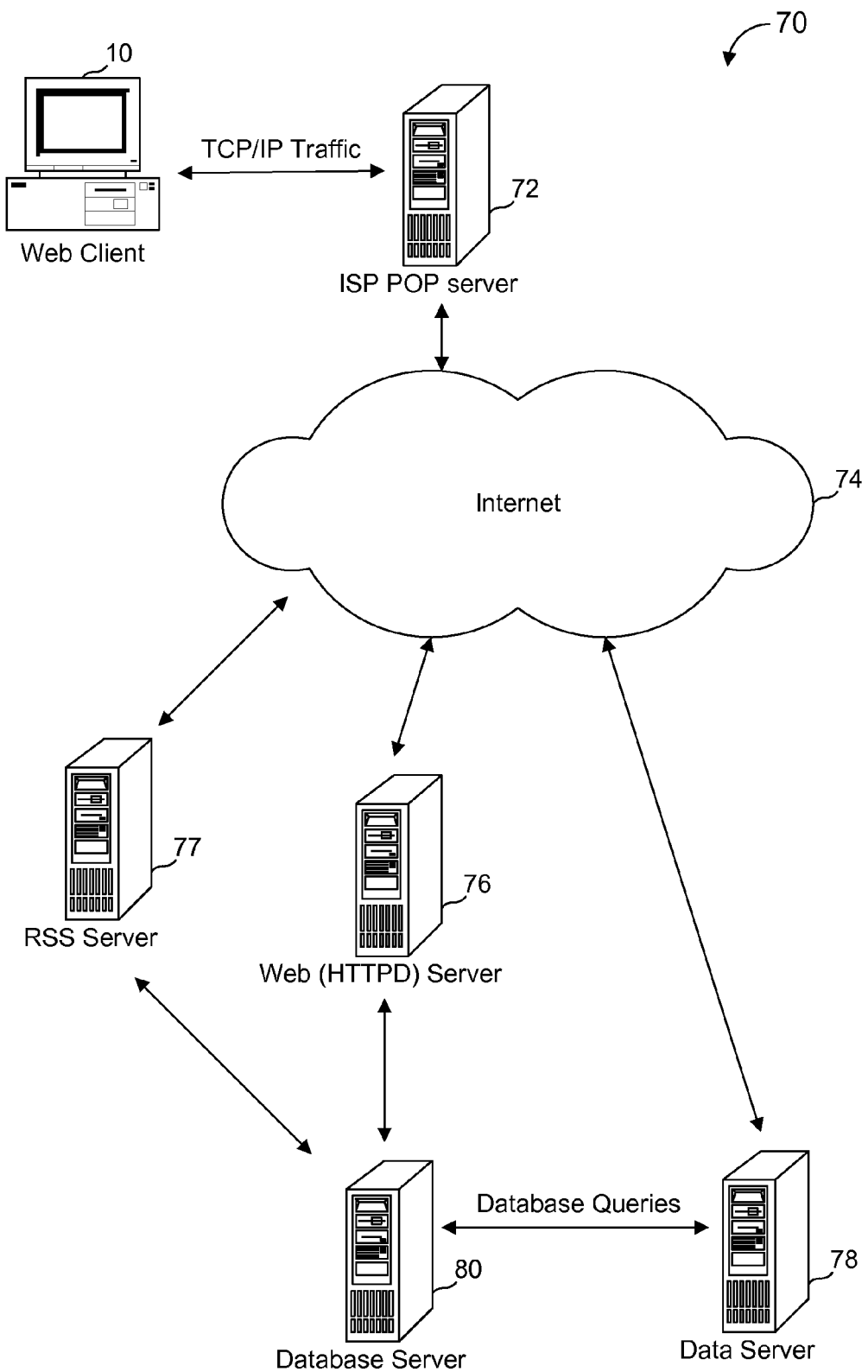
FIG. 6 shows an example of a computer network suitable for use with the present invention.

FIG. 6 shows an example of a computer network 70 suitable for use with the present invention. A client such as the computer 10 may access the Internet or other network via a point of presence server 72 or other server, such as provided by an ISP. The computer 10 may access various servers, such as a web or HTTP server 76, an RSS server 77, or other suitable server or other information provider. As previously described, the various computers 10, 76, 77 may communicate with one or more databases 80 or other data servers 78 to retrieve information. The general operation of the network 70 and the various components shown in FIG. 7 otherwise will be understood by one of skill in the art.

An embodiment of the invention may be embodied in the form of computer-implemented processes and apparatuses for practicing those processes. Embodiments of the present invention may also be embodied in the form of a computer program product having computer program code containing instructions embodied in tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing the invention. Embodiments of the invention also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments and illustrative examples, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-implemented method comprising:
receiving, at a computer processor, an update notification generated by a database system, the update notification being generated in response to a change made to data in a database table associated with an enterprise application;
identifying, by the computer processor, a searchable object definition associated with the database table, the searchable object definition specifying the location of searchable data within the database table;
based upon the searchable object definition, identifying, by the computer processor, a change to searchable data caused by the change made to the data in the database table;
initializing, by the computer processor, an event message queue;
generating, by the computer processor, an event message from the update notification, the event message describing the change to searchable data;
adding, by the computer processor, the event message to the event message queue;
de-queuing, by the computer processor, the event message from the event message queue;
transforming, by the computer processor, the event message into an asynchronous feed message;
adding, by the computer processor, the asynchronous feed message to an asynchronous feed queue; and
responsive to a crawl request received from a search engine crawler, providing, at the computer processor, the asynchronous feed message to the search engine crawler.

2. The method of claim 1, further comprising:
queuing a plurality of user-defined messages to during an initial crawl of the data associated with the enterprise application.

3. The method of claim 1, further comprising storing the event message queue in a stand-by database, the stand-by database different from the database storing the database table.

4. The method of claim 1, further comprising:
receiving a search expression from a user;
searching data retrieved from the asynchronous feed based on the search expression; and
returning results of the search to the user.

5. The method of claim 1, wherein the asynchronous feed provided in a syndicated format.

6. The method of claim 5, wherein the asynchronous feed is provided in at least one of an RSS feed, an Atom feed, a FeedSync feed, a GData feed, an hAtom feed, a NewsML feed, an ICE feed, an OCS feed, an OML feed, an OPML feed, an RDF-based feed, a SyncML feed, or an XOXO feed.

7. The method of claim 5, wherein the asynchronous feed is provided by a stand-by database.

8. The method of claim 1, wherein access to the asynchronous feed is restricted based upon access permissions of the database system.

9. A non-transitory computer-readable medium storing a plurality of instructions which, when executed by a processor, cause the processor to perform a method comprising:
receiving an update notification generated by a database system, the update notification being generated in response to a change made to data in a database table associated with an enterprise application;
identifying a searchable object definition associated with the database table, the searchable object definition specifying the location of searchable data within the database table;
based upon the searchable object definition, identifying a change to searchable data caused by the change made to the data in the database table;
initializing an event message queue;
generating an event message from the update notification, the event message describing the change to searchable data;
adding the event message to the event message queue;
de-queuing the event message from the event message queue;
transforming the event message into an asynchronous feed message;
adding the asynchronous feed message to an asynchronous feed queue; and
responsive to a crawl request received from a search engine crawler, providing the asynchronous feed message to the search engine crawler.

10. The non-transitory computer-readable medium of claim 9, wherein the plurality of instructions which, when further executed by the processor, cause the processor to perform a method comprising queuing a plurality of user-defined messages to during an initial crawl of the data associated with the enterprise application.

11. The non-transitory computer-readable medium of claim 9, wherein the plurality of instructions which, when further executed by the processor, cause the processor to perform a method comprising storing the event message queue in a stand-by database, the stand-by database different from the database storing the database table.

12. The non-transitory computer-readable medium of claim 9, the plurality of instructions which, when further executed by the processor, cause the processor to perform a method comprising:
receiving a search expression from a user;
searching data retrieved from the asynchronous feed based on the search expression; and
returning results of the search to the user.

13. The non-transitory computer-readable medium of claim 9, wherein the asynchronous feed provided in a syndicated format.

14. The non-transitory computer-readable medium of claim 9, wherein the asynchronous feed is provided in at least one of an RSS feed, an Atom feed, a FeedSync feed, a GData feed, an hAtom feed, a NewsML feed, an ICE feed, an OCS feed, an OML feed, an OPML feed, an RDF-based feed, a SyncML feed, or an XOXO feed.

15. The non-transitory computer-readable medium of claim 9, wherein the asynchronous feed is provided by a stand-by database.

16. The non-transitory computer-readable medium of claim 9, wherein access to the asynchronous feed is restricted based upon access permissions of the database system.

17. A system comprising:
a memory device; and
a computer processor in communication with the storage device, the memory device having sets of instructions stored thereon which, when executed by the computer processor, cause the computer processor to:

receive an update notification generated by a database system, the update notification being generated in response to a change made to data in a database table associated with an enterprise application;

identify a searchable object definition associated with the database table, the searchable object definition specifying the location of searchable data within the database table;

based upon the searchable object definition, identify a change to searchable data caused by the change made to the data in the database table;

initialize an event message queue;

generate an event message from the update notification, the event message describing the change to searchable data;

add the event message to the event message queue;

de-queue the event message from the event message queue;

transform the event message into an asynchronous feed message;

add the asynchronous feed message to an asynchronous feed queue; and responsive to a crawl request received from a search engine crawler, provide the asynchronous feed message to the search engine crawler.

* * * * *

UNITED STATES PATENT AND TRADEMARK OFFICE
CERTIFICATE OF CORRECTION

| | | |
|---|---|---|
| PATENT NO. | : 8,090,684 B2 | |
| APPLICATION NO. | : 12/547810 | |
| DATED | : January 3, 2012 | |
| INVENTOR(S) | : Ghosh | |

It is certified that error appears in the above-identified patent and that said Letters Patent is hereby corrected as shown below:

In column 5, line 48, delete "'APPSEARH'" and insert -- 'APPSEARCH' --, therefor.

In column 6, line 3, delete "'APPSEARH'" and insert -- 'APPSEARCH' --, therefor.

In column 14, line 40, in Claim 12, delete "the" and insert -- wherein the --, therefor.

Signed and Sealed this
Third Day of April, 2012

David J. Kappos
*Director of the United States Patent and Trademark Office*